United States Patent [19]
Bibby et al.

[11] 3,726,132
[45] Apr. 10, 1973

[54] APPARATUS FOR INDICATING DEPARTURE FROM PREDETERMINED LIMITS

[75] Inventors: Malcolm M. Bibby; Raleigh W. Wise, both of Akron, Ohio

[73] Assignee: Monsanto Company, St. Louis, Mo.

[22] Filed: Apr. 28, 1969

[21] Appl. No.: 819,732

[52] U.S. Cl. ................................. 73/101, 73/15.6
[51] Int. Cl. ................................................ G01n 25/00
[58] Field of Search .......................... 328/146, 147; 340/172, 213, 149 R, 181; 73/117, 59, 101, 60, 15.6; 346/35, 34; 324/30 R; 235/150 W

[56] References Cited

UNITED STATES PATENTS

| | | | |
|---|---|---|---|
| 3,331,200 | 7/1967 | Byron et al. | 73/116 UX |
| 3,059,228 | 10/1962 | Beck et al. | 340/179 |
| 3,553,444 | 1/1971 | Tong | 235/151.35 |
| 3,555,258 | 1/1971 | Berthier | 235/181 |
| 3,568,143 | 3/1971 | Naquin | 340/15.5 |
| 3,581,558 | 6/1971 | Porter et al. | 73/101 |
| 2,901,739 | 8/1959 | Freitas | 340/213 |
| 2,905,520 | 9/1959 | Anderson | 346/34 |
| 3,053,079 | 9/1962 | Miller et al. | 73/60 |
| 3,068,450 | 12/1962 | Fletcher et al. | 340/149 |
| 3,090,223 | 5/1963 | Juffa et al. | 73/59 |
| 3,120,652 | 2/1964 | Weighton et al. | 340/147 |
| 3,182,494 | 5/1965 | Beatty et al. | 73/101 |
| 3,217,306 | 11/1965 | Hillman | 340/181 |
| 3,246,249 | 4/1966 | Boscia | 328/146 |
| 3,267,364 | 8/1966 | Page et al. | 324/30 |
| 3,320,618 | 5/1967 | Kuch et al. | 346/35 |
| 3,336,478 | 8/1967 | Franklin | 250/83.3 |
| 3,439,534 | 4/1969 | Pilgrim | 73/117 |

*Primary Examiner*—Jerry W. Myracle
*Attorney*—Sughrue, Rothwell, Mion, Zinn and Macpeak, Richard O. Terbe, J. E. Maurer and F. A. Brusok

[57] ABSTRACT

Testing apparatus which converts an electrical analog signal to digital form and then by the application of digital logic indicates and records departure from predetermined limits is disclosed. The apparatus also records in decimal form identification of the test composition specification limits and actual values at each test point over a selected testing range, over which range a parameter varies with time, and the value of the parameter is received in the form of an electrical analog signal.

13 Claims, 5 Drawing Figures

INVENTORS
MALCOLM M. BIBBY
RALEIGH W. WISE

ATTORNEYS

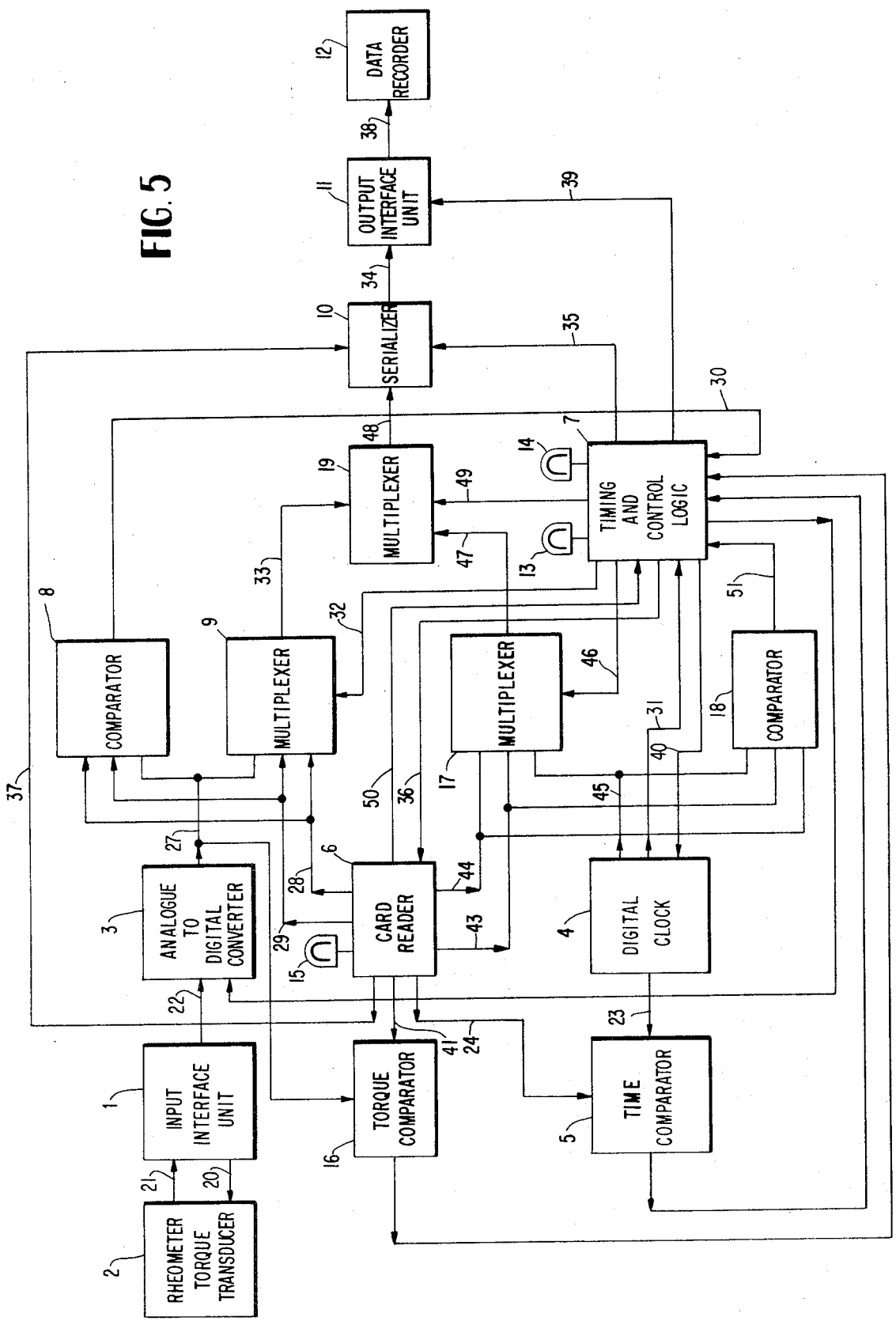

APPARATUS FOR INDICATING DEPARTURE FROM PREDETERMINED LIMITS

BACKGROUND OF THE INVENTION

1. Field of the Invention

The invention pertains to the art of measuring and recording by electrical means. It pertains to improvements in testing devices which measure a parameter which varies with time and particularly pertains to improvements, accessories or auxiliary equipment for devices which sense mechanical stress of plastic and other solid deformable substances by a DC electrical analog signal. Typical of such testing devices are curemeters.

2. Description of the Prior Art

Several methods are available for measuring and recording the stress signal obtained from testing instruments, such as the Oscillating Disk Rheometer disclosed in the copending U.S. patent application of George E. Decker, Ser. No. 282,527, filed May 6, 1963, or the instruments disclosed in Peter's U.S. Pat. No. 3,039,297, Cl. 73-88, assigned to Bayer (1962), or J. R. Beatty's U.S. Pat. No. 3,182,494, Cl. 73-101, assigned to the B. F. Goodrich Company (1965). Sensing the shearing forces on solid deformable substances subjected to the shearing action of an oscillating drive mechanism at predetermined strain over a predetermined time fraction of the strain cycle and converting the AC signal to a steady DC signal suitable for recording is described in U.S. patent application Ser. No. 634,257 to R. W. Wise, filed Apr. 27, 1967. In most of the aforesaid curemeters, torque is sensed by suitable strain gauges. At present, the condition of the curing rubber is monitored continuously (on chart recorders) and the cure curve is visually examined on completion of the curing process to ascertain whether or not predetermined specifications have been violated.

SUMMARY OF THE INVENTION

It is, therefore, an object of the present invention to provide a programmed system which automatically tests for specification violation at predetermined points prior to completion of the curing process, thereby eliminating the chart recorder presently used in production control of rubber product manufacturing.

Another object is to indicate departure from predetermined limits and to record limits and actual values at each test point over a selected testing range over which a parameter varies with time.

A further object is to provide a system which samples at predetermined times a DC analog signal of torque from the strain gauge of a curemeter, compares torque to the specification limits, records the values and limits and indicates when an actual value is out of specification.

According to the present invention, the foregoing and other objects are attained by providing a process by which departure from predetermined limits is indicated at each test point over selected testing range involving a parameter which varies with time indicated by an electrical analog signal which comprises converting the analog signal to a digital signal, coding the test composition and specification limits of time or of the parameter which varies with time in digital form at predetermined test points, either measuring the parameter at predetermined discrete times or measuring the time to reach a predetermined value of the parameter, comparing the test value with the specification limits and recording the limits and actual test value in decimal form. The apparatus according to the invention comprises, in combination, a coded record of the test composition, specification limits at predetermined test points, timing means and means cooperating therewith either for measuring the parameter at the predetermined times or measuring the time to reach a predetermined test value of the parameter, means for converting the analog signal to a digital signal, means for comparing the test value to specification values, means for indicating that the test value is outside limits, means for recording serially the limits and actual test value in decimal form. Preferably there is also provided means for recording that the test value is outside limits. The recording may provide in addition, if desired, a coded version of the information suitable for feeding to a computer. The aforesaid addition is convenient if statistical study of production control data is desired. The invention provides data acquisition and automated decision making when used with a curemeter by providing apparatus which indicates and records specification limits and actual values over a selected testing range.

BRIEF DESCRIPTION OF THE DRAWINGS

The specific nature of the invention, as well as other objects, aspects, uses and advantages thereof will clearly appear from the following description and from the accompanying drawings, in which:

FIG. 5 is a block diagram of a preferred embodiment of the invention.

DESCRIPTION OF THE PREFERRED EMBODIMENTS

Figure 1:
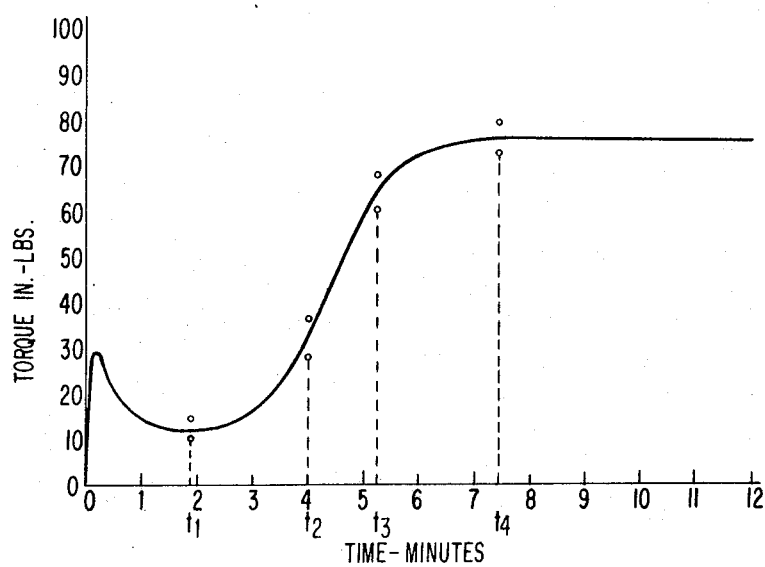
FIG. 1 is a typical cure curve obtained with a rheometer with specification limits marked out at four different times.

The specification limits and predetermined test times are preferably punched into a standard IBM 80 column card in binary coded decimal, BCD, code, (a widely used BCD code employs the numbers 1, 2, 4 and 8 only to form the decimal numbers 1-9 thus 7 = 1+2+4, etc.) The BCD code is preferred due to its compatibility with the digital logic employed throughout the system. Furthermore, coding is simplified by a decimal code. In the decimal system, a simple code is assigned to each digit of the number to be coded. The particular BCD code is merely a matter of choice. The 4,4,2,1 system, also widely used, is suitable. In a straight binary code, a unique code designation applies to the whole number and can be used if desired, but is less convenient due to more complicated calculations required for coding. The limits and times of FIG. 1 are punched into the card, six columns of which are available for compound identification and are printed at the initiation of the test. The print-out capability of this invention is a result of the use of digital circuitry. Analog systems could not have this capability.

Figure 2:
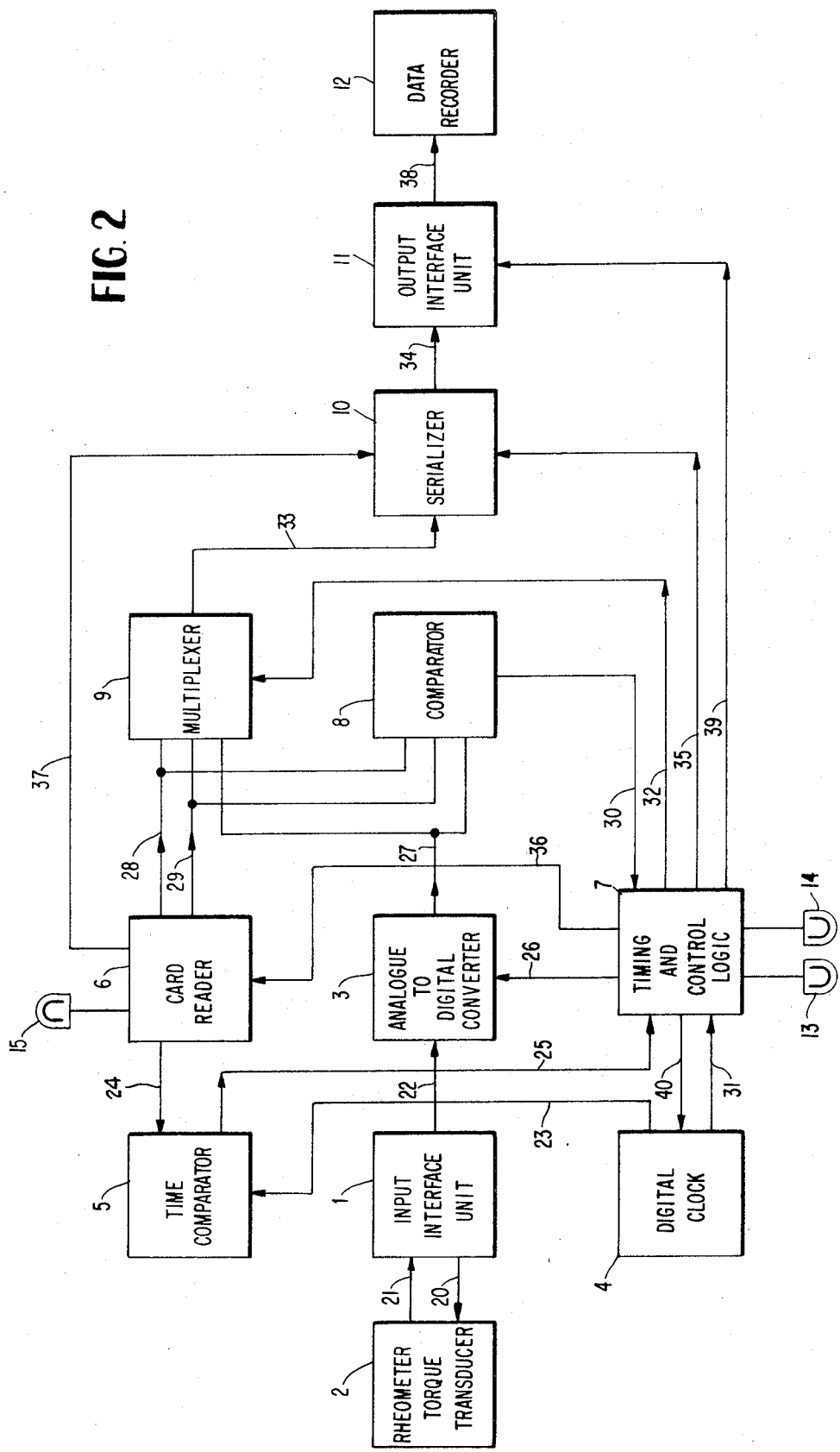
FIG. 2 is a block diagram of a simplified embodiment of the invention.

In the simplified embodiment of the invention illustrated in FIG. 2 designed for use with an oscillating disk curemeter, the actual torque values are measured at discrete predetermined times and compared to specification limits. It is convenient to employ an input interface unit 1 which contains the power source for exciting the strain gauge used to sense viscosity in a curemeter. The strain gauge connections provide power to the torque transducer 2 via line 20, while the analog torque signal is supplied via line 21 to the input interface from whence the analog torque signal continues via line 22. Versatility is thereby achieved because a different interface unit can be substituted where the requirements for exciting the strain gauges vary. For example, some strain gauges operate on a constant voltage and others on a constant current. The name "input interface" is used to designate the dual function of power supply for the strain gauges and an AC/DC converter. It will be appreciated that some curemeters contain an AC/DC converter so that the converter is not necessarily physically contained in the unit designated at 1 but may simply be connected therewith by appropriate switching means. The input interface unit for use with the aforesaid Wise invention of Ser. No. 634,257, wherein the shearing force is sensed at a predetermined time fraction of the strain cycle, will include a sample and hold amplifier because the predetermined test time will not necessarily coincide with the sampling time of the Rheometer and the value at the preceding sample time will then be used.

An analog-to-digital converter 3 is connected by line 22 to the output of the force transducer 2 via the input interface unit 1 and indicates, in the case of the Rheometer, the torque required to oscillate the rotor. The torque signal, in turn, is a measure of the modulus of the curing rubber. The BCD digital clock 4 constitutes a preferred timing means. The BCD encoded card is placed in a standard card reader 6 adapted for use with the type of card selected. Suitable readers for standard IBM 80 column cards are available from a number of manufacturers. The card reader contains two normally closed microswitches and unless the card is inserted correctly, the indicator light 15 is illuminated. The digital clock 4, which automatically starts at the beginning of a test, uses the line frequency to generate the timing pulses for which purpose BCD outputs for up to 99.9 mins. are produced. The clock outputs on line 23 are continuously compared in the time comparator 5 with the times encoded in the card, as indicated by the output on line 24. Time comparator 5 produces a command signal on line 25 on each occasion a test time is reached. More particularly, when the time comparator finds correspondence between the predetermined BCD coded test time and the BCD coded clock time, the command signal generated in the time comparator 5 is directed to a control in the timing and control logic 7. The timing and control logic 7 generates a command signal on line 26 to the analog-to-digital converter 3 to hold the test value existing at that time. The digital representation of the torque on line 27 is directed into the controls of the torque comparator 8 and of the multiplexer 9. The specification values, that is, upper and lower specification limits appearing on lines 28 and 29, respectively, of the card reader 6 are also received by the multiplexer 9 and by the torque comparator 8. The specification values are compared to the actual test value in the torque comparator 8. Should the actual value be outside the specification limits, an indicator lamp 13 is illuminated, and the information is stored in a flip-flop which is interrogated after the fourth test point and a character is printed in the "out-of-specification" column on the print-out sheet. The two lines to the flip-flop are represented by 30. The indicator light 13 is run directly off the flip-flop and once illuminated, remains lighted throughout all of the test points. However, for recording on the data recorder 12, the information is stored.

The digital clock 4 serves the dual function of timing and providing timed pulses for actuating the multiplexer 9 and the BCD decimal serializer 10. Timed pulses are transferred by line 31 to the timing and control logic 7 where they are gated and distributed. Indicator light 14 comes on at the beginning of a test to show that a test is in progress. At each test point the multiplexer 9 is actuated by clock pulses from the digital clock 4 routed through the timing logic 7 to the multiplexer via line 32. Line 32 is the path for the pulse sequence used to select data from each of the three torque inputs on lines 27, 28 and 29 and is composed of three lines, one associated with the lower limit, one with the higher limit, and one with the measured torque. Only one line can have voltage at any one time so that only the data associated with one line can be transferred at one time. The preferred order is lower limit, actual value and higher limit. The multiplexer presents the low specification value, the torque reading and the high specification value in turn to the BCD decimal serializer 10. The latter circuitry accepts the parallel BCD data via line 33 and converts it to serialized decimal on output line 34 which is printed or punched out, via the output interface unit 11, on a typewriter, teletype terminal, paper tape punch or other similar device 12. The pulse sequence to convert parallel data to serial form is carried by line 35 which is composed of four lines because there are four decimal digits. Both the serializer 10 and multiplexer 9 are standard items of commerce and require no detailed explanation.

The apparatus described accommodates times up to 99.9 minutes and parameter values up to 199.9. Thus, the clock output on line 23 to the time comparator 5 requires 4 BCD lines representing 1, 2, 4 and 8, respectively, for each of the three decimal digits or a total of 12. The digital representation of torque on line 27 requires 13 lines, the extra line being necessary to provide for the 1 of the hundreds digit to reach 199.9. Simple additions to the circuitry would provide for longer times and higher parameter values.

The time value on the card to be tested for coincidence with the digital clock time is carried by line 24 for which purpose 12 lines again must be supplied. Time coincidence generates a command signal on line 25 for which only one line is needed to the timing and control logic 7 which then generates another command signal on line 26 to analog-to-digital converter 3. However, the first function of timing and control logic 7 is to provide at the commencement of the test six pulses which are sequentially dispatched via line 36 to the card reader 6. These six pulses in turn activate each of the six columns allocated on the card for identification purposes. The identification information coded in BCD is routed directly via line 37 into the BCD to decimal converter portion of BCD decimal serializer 10 and is immediately printed out. The transfer of compound identification requires four lines. If no holes have been punched on the card in the six columns allocated for compound identification, then six zeros will be printed out.

The serialized decimal output on line 34 comprises 10 lines to represent each of the figures 0–9. Output interface unit 11 is essentially an amplifier. The serialized decimal output on line 34 is at low voltage and the power must be amplified to that required to operate the data recorder. In the case of a typewriter, a solenoid is under each key 0–9 and power sufficient to operate the solenoids is required. Each of the ten lines constituting line 34 terminates at a small amplifier. The amplified signals are carried by line 38 to the solenoids. The amplified signals are carried by 14 lines, 10 of which have been previously identified. Four additional lines are required for space, period, carriage return and out-of-limits signal which conveniently may be a question mark. The aforesaid four lines are carried to the output interface unit via line 39.

Eleven columns are allocated to each of four test points. After compound identification has been printed out, a voltage is applied to and subsequently maintained on the 11 columns containing the information pertaining to the first test point. Thereafter the timing logic is quiescent until a time coincidence pulse is received from the time comparator circuit. Upon receipt of a time coincidence, the following steps occur.

Step  Activity

I. A pulse is dispatched via line 39 to the output interface unit 11 to activate the space key on the typewriter 12.

II. A voltage is applied to the lower set point (LSP) line 29 on the multiplexer 9. This causes the LSP to appear in BCD at the input to the BCD decimal serializer 10.

III. If the LSP number presented to the serializer is say 123.9, then three pulses are routed sequentially to the BCD decimal serializer via line 33 and the numbers 1, 2 and 3 are printed out. At line 33 13 lines are required to handle numbers up to 199.9. A pulse is then dispatched via line 39 to the output interface unit 11 to activate the period key on the typewriter 12. Finally, a pulse is again routed into the serializer via line 33 to cause a printout of the number 9. If the first number is zero, the signal is suppressed and the space key is activated instead of printing zero.

IV. The voltage applied to the LSP is now transferred to line 26. This causes the BCD representation of torque provided by the analog-to-digital converter 3 to appear at the input to the BCD decimal serializer.

V. Step III is now repeated. Simultaneously, however, the set point comparator 8 is interrogated for specification violations; a flip-flop in timing and control logic 7 is toggled if a violation occurs and the indicator light 13 is illuminated. This flip-flop is itself interrogated at the end of the test in Step X.

VI. The voltage applied to line 27 is now transferred to the Upper Set Point (USP) line 28. This causes the USP to appear in BCD at the input to the BCD decimal serializer 10.

VII. Step III is now repeated.

VIII. The information relating to the first test point has now been printed. The voltage applied to the eleven columns related to the first test point is transferred to the next 11 columns which hold the second test point information.

IX. Three more time coincidence signals will be received by the timing and control logic 7 and on each occasion the same procedure, that is, Steps I through VII will be repeated. The positions referred to in Step VIII will be updated by one position on each occasion except that at the end of the fourth test point the voltage will go back to the eleven columns associated with the first test point, that is, ready to start again.

X. Upon completion of the printout of the fourth test point, the flip-flop mentioned is Step V is interrogated. If it has been toggled, it will permit a pulse to be routed to the space key on the typewriter and then a second pulse to be routed to the "question mark" key on the typewriter. The flip-flop is then reset to its normal position. If the flip-flop had not been toggled, Step XI would be executed immediately.

XI. A pulse is routed to the "carriage return-line feed" key on the typewriter.

XII. Finally, a voltage is applied to the clock reset line 40. This returns the clock counting circuit to zero and holds it there until the start of the next test.

In its preferred form, the record provided by the system of FIG. 2 produces an output format which lends itself to statistical studies of the four test points. Each complete test occupies exactly one row and the actual test values of each test are listed vertically one above the other which permits direct observation of reproducibility. The preferred format is shown by the following table where, under each test, the numbers represent lower specification limits, actual value and high specification limits, respectively.

| Compound | 1st test | | | 2nd test | | | 3rd test | | | 4th test | | | Off spec. |
|---|---|---|---|---|---|---|---|---|---|---|---|---|---|
| 120468 | 12.6 | 11.7 | 16.6 | 27.0 | 32.4 | 33.0 | 59.1 | 51.6 | 65.1 | 76.0 | 65.2 | 80.0 | ? |
| 120468 | 12.6 | 11.7 | 16.6 | 27.0 | 32.9 | 33.0 | 59.1 | 47.8 | 65.1 | 76.0 | 60.1 | 80.0 | ? |
| 120468 | 12.6 | 13.0 | 16.6 | 27.0 | 31.4 | 33.0 | 59.1 | 60.1 | 65.1 | 76.0 | 77.0 | 80.0 | . |
| 120468 | 12.6 | 11.6 | 16.6 | 27.0 | 31.4 | 33.0 | 59.1 | 47.1 | 65.1 | 76.0 | 60.9 | 80.0 | ? |
| 120468 | 12.6 | 11.9 | 16.6 | 27.0 | 31.9 | 33.0 | 59.1 | 47.3 | 65.1 | 76.0 | 60.7 | 80.0 | ? |
| 120468 | 12.6 | 11.9 | 16.6 | 27.0 | 31.6 | 33.0 | 59.1 | 47.4 | 65.1 | 76.0 | 60.9 | 80.0 | ? |

There is at present no accepted method of applying specification limits to a rheometer curve. The two basic types of gates possible are torque gates and time gates.

Torque gates operate at a predetermined time and compare rheometer torque values against prespecified upper and lower torque limits. These gates are essential for minimum torque (viscosity) and maximum torque values. However, they are not entirely satisfactory on the fast rising portion of the rheometer curve.

Time gates operate at a predetermined torque value and compare the time actually taken to reach this torque value against prespecified minimum and maximum times. These gates are best suited to operate on the rising portion of a fast curing rubber stock.

Figure 3:
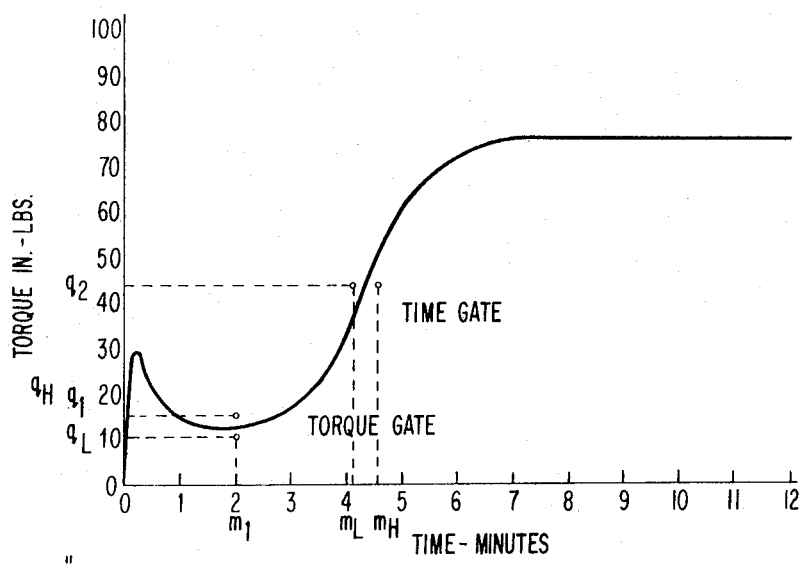
FIG. 3 is a cure curve showing examples of two gates, that is, torque and time.

Examples of these two, that is, torque and time gates, are shown on the accompanying rheograph, FIG. 3.

was between $m_L$ and $m_H$, if no specification violation occurs using the system of FIG. 2.

The system of FIG. 2 will be fully understood by those skilled in the art from the foregoing explanation and the following table which relates the blocks and functions of FIG. 2 to components. The integrated circuit type is given. DM identifies the National Semiconductor Co., SN the Texas Instrument Co., and MC the Motorola Company.

| Block of Fig. 2 | Function of block | Integrated circuit type | Quantity | Component |
|---|---|---|---|---|
| 5 | To generate a coincidence signal immediately, the time for a test point as encoded on the card equals the time generated by the clock. | DM8200N | 4 | 4-bit comparators. |
| 4 | To generate real elapsed time indication and provide timing pulses to the control circuitry for printout purposes. | SN7490N<br>MC853P<br>MC3000L<br>MC3003L | 6<br>1<br>1<br>1 | Decade counters.<br>Dual J-K flip-flop.<br>Quad 2i/p NAND gate.<br>Quad 2i/p OR gate. |
| 6 | To read data punched in BCD form on a standard 80-column card reader. | MC3010L<br>MC3001L<br>MC3015L | 24<br>1<br>4<br>1 | Dual 4i/p NAND gates.<br>Quad 2i/p AND gates.<br>8 i/p NAND gate.<br>"AMP" card reader type 2980 A. |
| 3 | To convert analog signals in the 0–200 mV DC range into BCD form. | | | Digital panel meter, United Systems Corp., Model 271-1N. |
| 7 | To accept timing pulses from 4 and coincidence signals from 5; to distribute logic pulses through the desired operation and output. | SN74H11N<br>SN7476N<br>MC836P<br>MC846P<br>MC852P<br>MC853P<br>MC3001L<br>MC3003L<br>MC3005L<br>MC3025L<br>MC3026L | 3<br>3<br>3<br>3<br>1<br>1<br>3<br>2<br>2<br>2<br>2 | Triple 3i/p AND gate.<br>Dual J-K flip-flop.<br>Hex inverter.<br>Quad 2i/p NAND gate.<br>Dual J-K flip-flop.<br>Dual J-K flip-flop.<br>Quad 2i/p AND gate.<br>Quad 2i/p OR gate.<br>Triple 3i/p NAND gate.<br>Dual 4i/p NAND power gate.<br>Dual 4i/p AND power gate. |
| 9 | To sequentially present at its output the lower specification limit, the torque value and the upper specification limit on command. | SN74H52N | 13 | Quad 2i/p AND-OR gates. |
| 8 | To compare the torque (MBCD) against the specification limits encoded on the card and provide an out of specification signal when necessary. | DM8200N | 8 | 4-bit comparators. |
| 10 | To convert to a serialized decimal output the parallel BCD input. | SN74H11N<br>SN74H52N<br>SN7442N<br>MC834P<br>MC3001L<br>MC3003L | 1<br>4<br>1<br>2<br>1<br>1 | Triple 3i/p AND gate.<br>Quad 2i/p AND-OR gate.<br>BCD-decimal converters.<br>Hex. inverters.<br>Quad 2i/p AND gate.<br>Quad 2i/p OR gate. |

FIG. 3 shows torque gates $q_L$ and $q_H$ and time gates $m_L$ and $m_H$. The torque gates at time $m_1$ represent the lower specification limit $q_L$ and the higher specification limit $q_H$ at a point on the curve where the slope is slight. The torque $q_1$ at time $m_1$ is within the acceptable limits. Time gates are shown on the steep part of the curve. A predetermined torque $q_2$ is selected and time $m_L$ designates the minimum and time $m_H$ designates the maximum time acceptable for reaching $q_2$.

Figure 4:
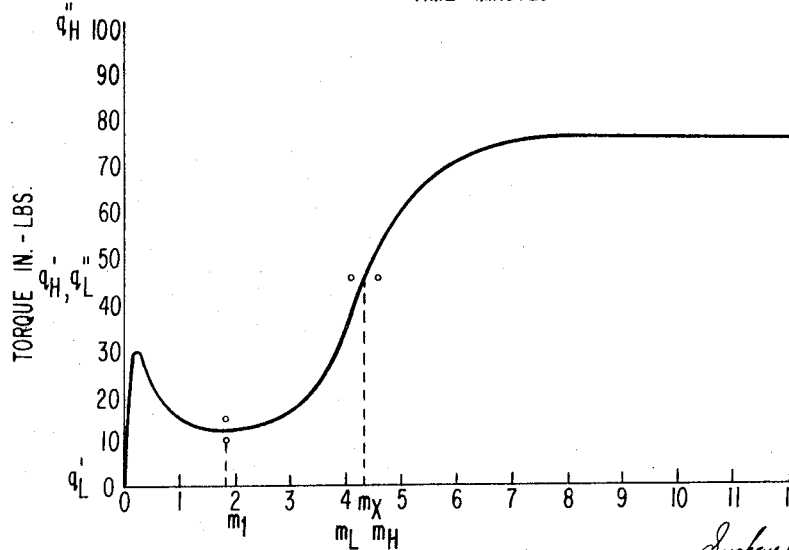
FIG. 4 is a cure curve illustrating use of two torque gates as a time gate.

However, it is possible to form a time gate from two torque gates as shown in FIG. 4. The higher specification limit of one test point is made equal to the lower specification limit of the next test point, thereby providing equal torque gates separated by time. Referring to FIG. 4, the first test point, at time $m_1$, is examined as before but the lower specification value, $q'_L$ for the second test point at time $m_L$ is set at zero, and the lower specification value $q''_L$ at the third test time $m_H$ is set equal to $q'_H$, the higher specification value at time $m_L$. The upper specification limit at time $m_H$ is set at some high figure, for example, 99.9. Times $m_L$ and $m_H$ are the selected lower and upper specification limits for the torque to reach $q'_H = q''_L$, and although the actual time $m_x$ is not measured, it will be known that $m_x$ A preferred embodiment of the invention which permits comparison either of torques at predetermined times or of times at predetermined torques is illustrated by FIG. 5. Blocks 1–15 remain as in FIG. 2, but components 16–19 are added.

| Block of Fig. 5 | Function of block | Integrated circuit type | Quantity | Component |
|---|---|---|---|---|
| 16 | To generate a coincidence signal immediately the torque for a test point as encoded on the card is equal to or greater than the torque value indicated by the analog-to-digital converter. | DM8200N | 4 | 4-bit comparator. |
| 17 | To sequentially present at its output the lower time limit, the true time and the upper time limit on command. | SN74H52N | 13 | Quad 2i/p AND-OR gates. |
| 18 | To compare elapsed time against specification limits encoded on the card and provide an out of specification signal when necessary. | DM8200N | 8 | 4-bit comparator. |
| 19 | To relay to the output of either 7 or 9. | TNG7254 | 7 | Dual 2i/p AND-OR gates. |

It will be noted that three of the four additions comprise duplicates of blocks already present, thus 16, 17 and 18 are the same as 5, 9 and 8, respectively. The operation of the system simply entails extension of the principles already discussed. The torque value on the card is transmitted by line 41 comprising 13 lines to torque comparator 16 and the torque coincidence signal transmitted via line 41 to the timing logic and controls 7 for which purpose only a single line is needed. Transfer lines 43 and 44 of 12 lines each serve to get the minimum and maximum limits from the card reader into the multiplexer and into the specification limit comparator. The digital representation of elapsed time to be compared with the minimum and maximum time limits is transmitted by line 45. Line 46 is the path for pulse sequence used to select data from each of the three time inputs 43, 44 and 45. As before, line 33 is the path of torque data in parallel BCD form data but is fed to a two-way multiplexer 19 instead of directly to the serializer 10, and line 47 is the path of time data in parallel BCD form. The parallel BCD data selected in 19 travels via line 48 to the serializer 10. The output on line 49 controls whether the two-way multiplexer selects torque or time for which purpose two lines are required. In FIG. 5, an extra line 50 is needed besides the 10 lines of line 36 to inform the timing and control logic 7 whether torque or time coincidence is sought. The particular type of coincidence, that is, time or torque, is coded on the card for each test point. The timing and control logic circuitry uses this information to control the multiplexer.

If time is out of limits, the flip-flop is activated by line 51 composed of two lines to dual set point comparator 18.

Although the primary purpose of this invention is to provide a recorder and indicator for production control use in the rubber industry, any system which has a parameter that varies with time could, through a suitable sensor/transducer, be coupled to the instrument of this invention. Gas chromatography and various forms of spectroscopy fall into this category. The examples of the invention disclosed herein were chosen merely to illustrate typical embodiments of the invention, and it will be appreciated that the invention is not limited thereto.

Furthermore, it will be apparent that the embodiments shown are only exemplary and that various modifications can be made in construction and arrangement within the scope of the invention as defined in the appended claims.

We claim:

1. Method of applying predetermined specification limits, selected on a rheometer cure curve of a vulcanizable elastomer, to rheometer test data received in the form of an electrical analog signal of torque comprising:

reading electronically a coded record of specification limits at two or more predetermined test points on the cure curve selected from a point in the vicinity of minimum torque, a point in the vicinity of maximum torque and a point at an intermediate point on the steep part of the cure curve and generating digital signals representative of said limits, generating timing signals and a command signal to initiate comparison of the specification limits with test values at the predetermined test points, selectively measuring torque at the predetermined times or measuring times to reach predetermined torques, converting the analog test signals to digital signals, electronically comparing the test values to the specification values, mechanically recording the specification limits and actual test values.

2. Testing apparatus for indicating departure from predetermined specification limits and for recording said limits and actual test values at each test point over a selected range over which range a parameter varies with time, the value of the parameter being received in the form of an electrical analog signal, the predetermined specification limits and test points appearing in coded form on a coded record, comprising:

a. record sensing means for reading the coded record of the specification limits at predetermined test points and supplying digital signals representative of the specification limits and test point values, said test point values corresponding to predetermined times over said range and predetermined values of the parameter, b. converting means for converting said analog signal to a digital signal, which provides a digital measure of said parameter, c. means for generating signals representing the time over which the parameter varies, d. first compare means for comparing the value of the parameter received from said converting means at predetermined times with the specification limits received from said record sensing means at said times and second compare means for comparing the times to reach predetermined values of the parameter received with the specification limits at said predetermined parameter values, said first and second compare means including means for indicating when a test value is outside the specification limits, e. first command means responsive both to said digital signals representative of said test point values and to signals representative of the time over which the parameter varies for producing first command signals, and second command means responsive both to said digital signals representative of said test point values, and to signals representative of the value of the parameter for producing second command signals, f. control means, responsive to said first and second command means, said first and second compare means and said record sensing means for generating digital timing signals and g. recording means, responsive to said record sensing means, said converting means and said control means for serially recording the specification limits and the actual test value of the parameter in decimal form.

3. The testing apparatus as recited in claim 2 wherein said record sensing means further generates an identification signal and said recording means records said identification signal and is responsive to said first and second compare means for recording whether a test value is outside the specification limits.

4. The testing apparatus as recited in claim 3 further comprising a torque measuring means.

5. The testing apparatus as recited in claim 2 further comprising a viscosity sensor which senses the changes in viscosity of a solid deformable substance during the test and wherein the torque is a measure of the viscosity, said sensor producing said electrical analog signal which is proportional to torque.

6. The testing apparatus as recited in claim 5 wherein said record sensing means and said converter means include means for generating binary coded decimal signals.

7. The testing apparatus as recited in claim 2 wherein said record sensing means is a card reader.

8. The testing apparatus as recited in claim 7 wherein said means for generating a command signal comprises:
   a. time comparing means responsive to said timing signals and said record sensing means for generating a command signal when the timing signals correspond to a predetermined time, and
   b. parameter comparing means responsive to said time varying parameter and said record sensing means for generating a command signal when the value of the time varying parameter corresponds to a predetermined parameter value.

9. The testing apparatus as recited in claim 8 wherein said recording means comprises:
   a. multiplexing means responsive to said control means, said record sensing means and said converter means for sequentially presenting at its output the lower specification limit, the measured value of the parameter and the upper specification limit,
   b. serializer means responsive to the output of said multiplexer means and controlled by said control means for providing a serialized decimal output, and
   c. a typewriter receiving said serialized decimal output and typing out said lower specification limit, said measured value and said upper specification limit.

10. Testing apparatus for indicating departure of the value of a measured time varying parameter from predetermined limits and for recording the limits and the actual measured test values of the parameter at each test point over a range in which the parameter varies with time comprising:
   means for receiving an analog signal representative of the value of the parameter,
   converting means for converting said analog signal to a digital signal,
   means for generating signals representing the time over which the parameter varies,
   record sensing means for reading a coded record of the predetermined limits and test point values and for supplying digital signals representative of the predetermined limits and test point values, said test point values corresponding to predetermined times over said range,
   means, responsive to said test point values and signals representing time over which the parameter varies for generating command signals,
   compare means, responsive to said command signals, for comparing the digital signal representing the value of the parameter with said predetermined limits at predetermined times, and
   recording means responsive to said record sensing means and said converting means for serially recording the predetermined limits and the actual value of the parameter at the predetermined times in decimal form.

11. Testing apparatus as recited in claim 10 further including indicator means responsive to said compare means for producing a signal indicating that the value of the parameter is outside said predetermined limits.

12. Testing apparatus for indicating departure from predetermined time limits at test points over a selected range over which a parameter varies with time said limits and test points being stored on a coded record comprising:
   means for receiving an analog signal representative of the value of the time varying parameter,
   converting means for generating a digital signal representative of the value of said parameter,
   means for generating signals representing the time over which the parameter varies,
   record sensing means for reading a coded record of the predetermined limits and said test points and for supplying digital signals representative of the predetermined limits and the test points, said predetermined limits corresponding to time limits for the parameter to reach predetermined values, said test points being said predetermined parameter values,
   means responsive to said digital signal representing said predetermined parameter value and to said digital signal representative of the value of a time varying parameter for generating a command signal, and
   compare means, responsive to said command signal, for comparing the predetermined time limits with the time signals generated by said time signal generating means, said compare means including means for indicating departures from said predetermined limits.

13. Testing apparatus as recited in claim 12 further including recording means responsive to said record sensing means and said converting means for serially recording predetermined time limits and the time generated by said time signal generating means at the test points in decimal form.

* * * * *